United States Patent Office 2,927,912
Patented Mar. 8, 1960

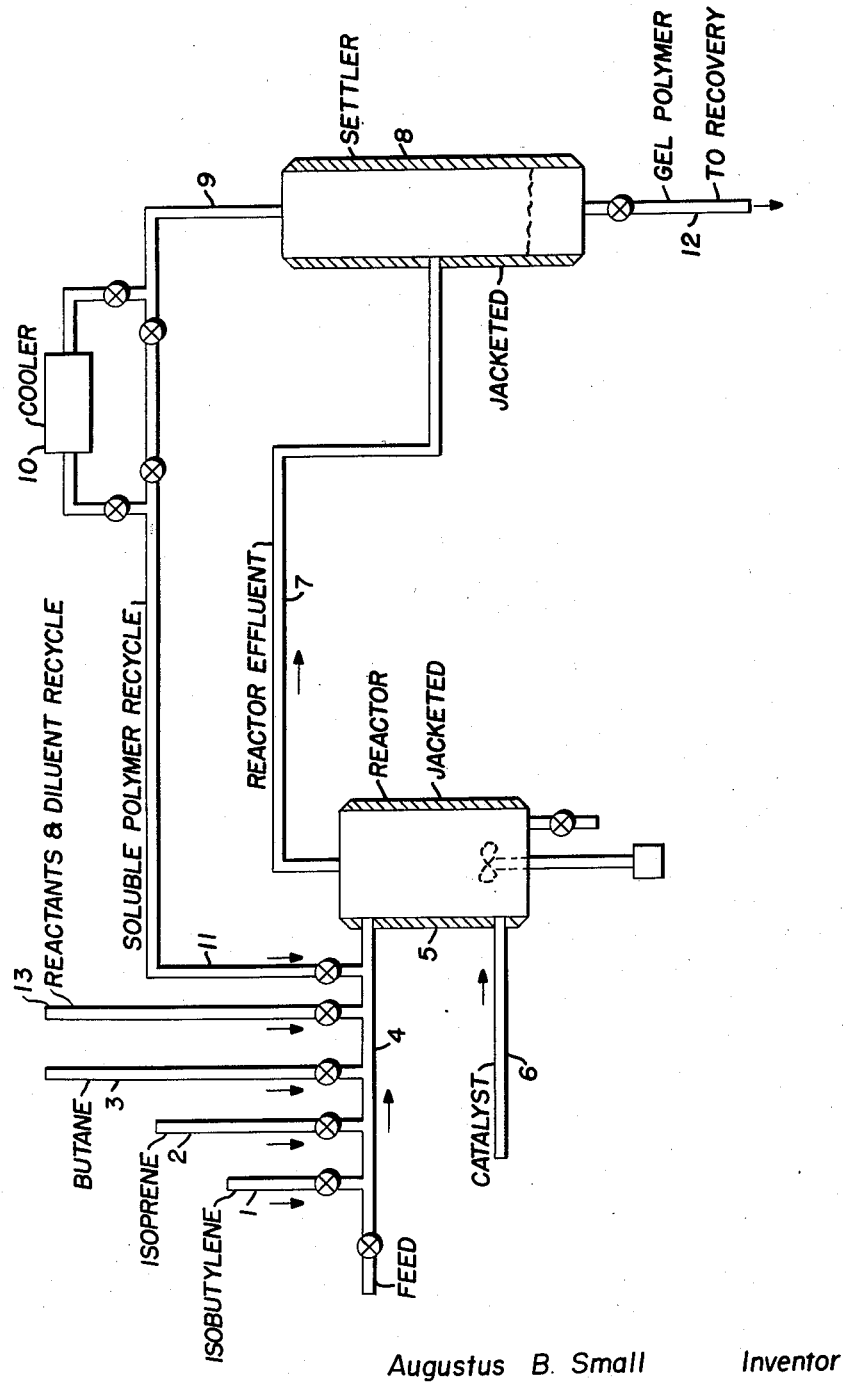

2,927,912

PREPARATION OF BUTYL RUBBER IN SOLUTION

Augustus B. Small, Baton Rouge, La., assignor to Esso Research and Engineering Company, a corporation of Delaware Application June 28, 1954, Serial No. 439,720

6 Claims. (Cl. 260—85.3)

This invention relates to a new method for carrying out a low temperature Friedel-Crafts copolymerization of isoolefins and diolefins to make synthetic rubber, and it relates particularly to an improved method of effecting such polymerization in the presence of a liquid which is not only a solvent and diluent for the reacting monomers but also a solvent for the resulting polymer.

It is known, as described in U.S. Patent 2,356,128 and others, that a high quality synthetic rubber may be made by copolymerizing a major proportion of isobutylene and a minor proportion of diolefin, e.g., 1 to 5 percent of isoprene, in the presence of methyl chloride as diluent, preferably at −50 to −110° C. The polymer formed is insoluble in methyl chloride and precipitates as a slurry.

It has previously been suggested to polymerize the reactants in the presence of a liquid which is also a solvent for the polymer, and it has been demonstrated that isobutylene-isoprene synthetic rubber copolymers of good quality can be prepared using hydrocarbons, such as paraffins of $C_4$ to $C_7$ or 8 range, as the diluent-solvent.

Optimum conditions using butanes as diluents are 70 to 80 percent monomers in the reactor solution at equilibrium, and temperatures of −60 to −100° C. The reactor effluent from such a system is a clear to slightly cloudy solution or stable suspension containing perhaps 3 to 10, generally about 5 to 7, percent polymer.

One advantage of a solution process, in contrast to the commercial insoluble slurry process, is reduction of refrigeration costs by using heat-exchange for cooling fresh feed with the cold reaction mixture. However, the necessary heat exchanger equipment is expensive, and there are still problems of fouling of equipment and lines by polymer which comes out of solution and deposits on interior solid surfaces, which then decreases the heat exchange efficiency.

According to the present invention the over-all polymer quality is improved, and at the same time a considerable savings in the cost of producing the polymer is effected. This is done by taking the reactor effluent which is composed of dissolved polymer, insoluble or gel polymer and unreacted feed and passing it into a settling zone such as a tank or other suitable equipment. The difference in density of the gel polymer and the solution is sufficient to cause the gel polymer to settle to the bottom. The resulting upper substantially clear solution is then fed back to the reactor along with only enough fresh feed to make up for the gel polymer removed. The gel polymer is withdrawn from the bottom of the settler and may be recovered by any suitable means such as a wet finishing process in which the gel polymer slurry is injected into a hot water flash tank to flash off volatile solvent and leave a slurry of insoluble copolymer particles in water, or by a "dry" recovery process (not using water) in which the volatile solvent and unreacted monomers are flashed off from a hot drum drier or other suitable equipment.

By this technique the highest Mooney (mol. wt.) polymer is readily separated and recovered without being contaminated by the less desirable low molecular weight dissolved polymer. This latter will have an indefinite residence time in the reactor, by reason of recycling, wherein it will be given further opportunities to enter into the polymerization reaction.

Volatile solvent and unreacted raw materials which are flashed off either in the wet or dry finishing processes should, of course, be recondensed, purified if necessary, cooled, and recycled to the reactor. Refrigeration costs are greatly reduced by means of this invention since only a relatively minor amount of solvent and unreacted raw materials have to be vaporized and recycled through the condensation, purification, and refrigeration equipment. This reduces refrigeration costs to only a minor fraction of what would be necessary if the entire polymerization reaction liquid were subjected directly to polymer recovery operations.

In carrying out this invention, the polymerization feed may consist of isoolefins of 4 to 5 carbon atoms, such as isobutylene, and of diolefins of 4 to 6 carbon atoms, such as butadiene, isoprene, dimethylbutadiene; generally a major proportion of the isoolefins and a minor proportion of diolefins, e.g. about 1 to 10 percent of isoprene or other diolefin of 5 to 6 carbon atoms. The solvent to be used is preferably any liquid saturated hydrocarbon, preferably the paraffins such as butanes, pentanes, hexanes, or heptanes or commercial petroleum fractions, preferably of narrow boiling range and highly refined. These solvents should be preferably substantially free of aromatics and unsaturated constituents and free from sulfur or other impurities which harmfully affect the Friedel-Crafts polymerization. The particular solvent to be used can be varied according to the polymerization temperature used and the proportion of reacting monomers in the feed. In general, the lower boiling solvents, such as butane, should be used for the lowest polymerization temperatures, whereas a higher boiling solvent such as heptane is preferred for the only moderately low temperature.

The catalyst to be used may be any Friedel-Crafts catalyst which is sufficiently soluble in the hydrocarbon solvent. Aluminum bromide is satisfactory, or any of the known hydrocarbon-soluble Friedel-Crafts comounds or complexes.

The polymerization temperature should be below 0° C. and preferably is in the range of −50° C. to −110° C. and this low temperature may be maintained by either internal or external refrigeration by known methods.

The accompanying drawing shows a schematic layout for carrying out the phase separation of a polymerization reactor effluent and for recycling the soluble polymer phase.

Referring to the drawing, liquid isobutylene is fed in through inlet pipe 1 and liquid isoprene through pipe 2 and butane or other desired diluent through pipe 3, all into the feed line 4 into the reactor 5. Catalyst is fed into the reactor through line 6. Reactor effluent may be withdrawn continuously through line 7 into settling tank 8. After separation into two layers, substantially clear supernatant polymer solution is taken off the upper part of the tank through line 9 and, without any substantial rise in temperature, goes either directly or through cooler 10 by way of recycle line 11 back into the reactor.

The heavier phase which settles at the bottom of the settler 8 consisting of a concentrated slurry of gel polymer in a relatively minor volume of polymerization reaction liquid is withdrawn from the bottom of the settling tank 8 through line 12. From there it may go to any suitable polymer recovery equipment not shown. Recovered reactants and diluent from the polymer recovery equipment may be recycled back into feed line 4 through line 13 into reactor 5.

Thus by this invention the upper clear polymer solution may comprise about 50 to 80% of the total volume of the reactor effluent, and it may contain about 0.5 to 5% generally about 1 to 3% by weight of polymer, essentially completely dissolved, and this polymer will generally amount to about 5 to 50% of all of the polymer which was formed during the polymerization stage. On the other hand, the heavier settled phase of gel polymer suspension will amount to about 20 to 50% by volume of the total reactor effluent and it will generally contain about 50 to 90% of all the polymer which had been formed in the polymerization stage.

The insoluble or gel polymer will generally have a Mooney greater than about 70 (8 minutes at 212° F.). This polymer will thus have a Staudinger molecular weight polymer above about 60,000 and possibly in the 100,000 range. On the other hand, the dissolved polymer which is in the upper clear solution which is recycled to the reactor will generally have a Staudinger molecular weight less than about 25,000, and may range approximately from about 15,000 to 25,000.

The details and advantages of the invention will be better understood from a consideration of the following experimental data:

*Example*

A reactor was charged with 2,032 gms. composed of the following materials:

| | Gm. |
|---|---|
| Isobutylene | 1600 |
| Isoprene | 32 |
| Butane | 400 |

The polymerization reaction was effected by adding 220 ml. of a solution of 0.5 gm./ml. of $AlBr_3$ in hexane. The reaction temperature was maintained at about −101° C. to −99° C. Following addition of the catalyst over a period of about 18 minutes, the agitation in the reactor was stopped and the reactor contents allowed to settle about 15 minutes. Two layers formed, the upper one amounted to about 2000 ml. and the lower one about 200 ml., in volume, the insoluble or gel polymer being in the lower layer.

Recovery of the gel polymer layer, and examination of an aliquot of the upper liquid layer revealed the following:

| | Total | Percent of Total | (Mol. Wt.) |
|---|---|---|---|
| | Gms. | | |
| Precipitated polymer | 82 | 76 | [1] 59,000 |
| Dissolved polymer | 26 | 24 | 22,000 |
| Total | 108 | | |

[1] This sample was only approximately 50% soluble, so the actual mol. wt. of the precipitated polymer is likely 100,000 or more.

The total polymer produced, namely 108 gms., amounted to a conversion of about 6.6% by weight on the total weight of isobutylene and isoprene fed to the reactor.

This example shows the advantage of the invention in recovering 82 gms. (about 76% by wt.) of the total polymer formed, without expensive refrigeration of the major volume of the reactor effluent.

Also, 76% of the polymer is recovered without being contaminated by the remaining 24% lower molecular weight polymer. Normal recovery techniques would not permit this division.

It is not intended that this invention be limited to the specific materials and modifications of the invention which have been given merely for the sake of illustration but only by the appended claims in which it is intended to claim all novelty inherent in the invention as well as all modifications coming within the scope and spirit of the invention.

What is claimed is:

1. A process of making a high molecular weight synthetic rubber which comprises copolymerizing a major proportion of isobutylene with about 1 to 10 percent by weight of isoprene at a temperature of about −50° C. to −110° C., in the presence of saturated liquid paraffin hydrocarbon solvent of 4 to 7 carbon atoms in the presence of a Friedel-Crafts catalyst which is soluble in said solvent, a minor amount of the polymer formed as well as the reactants also being soluble in said solvent carrying out said polymerization continuously and passing the cold polymerization reaction mixture to a settling zone, where phase separation of the resulting mixture occurs, thereby producing an upper lighter density fraction containing dissolved therein a minor amount of relatively low mol. wt. polymer of about 15,000–25,000 Staudinger mol. wt., said polymer constituting about only 5 to 50 percent by weight of the total polymer produced in the polymerization stage, along with a major proportion of the unreacted monomers and solvent, and a heavier fraction containing suspended therein in substantially insoluble form a polymer of relatively high mol. wt. of about 60,000–100,000 Staudinger, constituting about 95 to 50 percent of the total polymer formed in the polymerization step, recycling said lighter dilute soluble polymer phase directly to the polymerization zone without substantial rise in temperature, separating the heavier concentrated polymer phase by density from the settling zone and injecting it into a hot water slurry zone to vaporize unreacted monomers and volatile solvent and to produce a slurry of insoluble isobutylene-isoprene synthetic rubber copolymer particles suspended in water, removing the said polymer particles from the water and drying them, and cooling and recycling the vaporized unreacted monomers and volatile solvent to the polymerization zone.

2. In a continuous process for making high molecular weight synthetic rubber wherein a major proportion of an isoolefin of 4 to 5 carbon atoms is copolymerized with a minor proportion of a diolefin of 4 to 6 carbon atoms at a temperature below 0° C. in the presence of a liquid paraffin hydrocarbon of 4 to 7 carbon atoms which is a solvent for both the reacting monomers and a minor amount of said synthetic rubber, and in the presence of a Friedel-Crafts catalyst which is also soluble in said solvent, the improvement which comprises passing the polymerization effluent to a settling zone, separating the insoluble rubber phase containing a polymer of relatively high mol. wt. of about 60,000 to 100,000 Staudinger from the soluble rubber phase containing relatively low mol. wt. polymer of about 15,000–25,000 Staudinger, by gravity, recycling the soluble rubber phase from the settling zone back to the polymerization zone without any substantial rise in temperature, withdrawing the insoluble rubber phase from the bottom of the settling zone and recovering a rubber having a Staudinger molecular weight above about 60,000.

3. A process according to claim 2 in which the separated insoluble rubber phase is injected into a hot water flash tank to flash off said solvent and leave a slurry of rubber particles in water.

4. A process according to claim 2 in which only enough fresh isoolefin and diolefin are added to the polymerization zone to make up for the amount of isoolefin and diolefin combined in the insoluble rubber phase.

5. Process which comprises copolymerizing a major proportion of an isoolefin of 4 to 5 carbon atoms with a minor proportion of a diolefin of 4 to 6 carbon atoms at a temperature below 0° C. in the presence of a liquid paraffin hydrocarbon of 4 to 7 carbon atoms which is a solvent both for the reacting monomers and for a minor amount of the resulting polymer, and in the presence of a Friedel-Crafts catalyst which is soluble in said solvent, carrying out the polymerization to a degree of conversion such that the effluent contains about 3 to 10% polymer, then settling the resulting mixture to obtain phase separation into two fractions, one of which, A, is a lighter density fraction containing a minor proportion of polymer formed which is of relatively low molecular weight of about 15,000–25,000 Staudinger, in which the polymer is essentially dissolved in the liquid, and the other fraction, B, is a heavier density fraction containing a major proportion of the polymer formed which is of relatively high molecular weight of about 60,000–100,000 Staudinger, and substantially all insoluble, separating fraction B by density prior to inactivating the catalyst, recycling the lighter fraction, A, to the polymerization zone without any substantial rise in temperature, and treating the heavier fraction, B, to inactivate residual catalyst and recover polymer therefrom.

6. A process according to claim 1 in which the solvent is butane.

References Cited in the file of this patent

UNITED STATES PATENTS

| | | |
|---|---|---|
| 2,356,128 | Thomas et al. | Aug. 22, 1940 |
| 2,400,129 | Nelson | May 14, 1946 |
| 2,451,047 | Skooglund | Oct. 12, 1948 |
| 2,728,457 | Clarke | Dec. 27, 1955 |

FOREIGN PATENTS

| | | |
|---|---|---|
| 682,695 | Great Britain | Nov. 12, 1952 |